Oct. 31, 1939.   H. MULCH   2,178,346
FILM REEL ATTACHMENT
Filed July 2, 1937
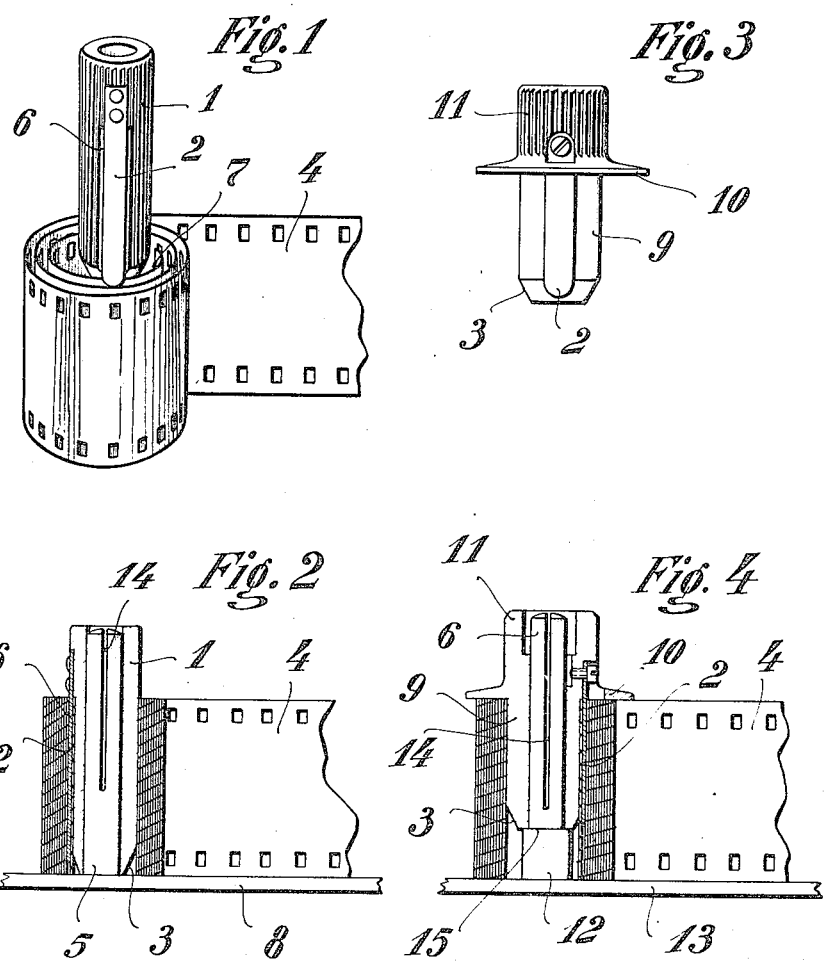
INVENTOR
Hans Mulch
BY
Ivan E. A. Konigsberg
ATTORNEY Patented Oct. 31, 1939

2,178,346

UNITED STATES PATENT OFFICE 2,178,346

FILM REEL ATTACHMENT

Hans Mulch, Wetzlar, Germany, assignor to Ernst Leitz, G. m. b. H., Wetzlar, Germany Application July 2, 1937, Serial No. 151,612
In Germany August 25, 1936

3 Claims. (Cl. 242—74)

This invention relates to a film reel attachment for attaching spools of motion picture films to the reels of a projection apparatus.

Motion picture films are kept and transported in rolled up condition in flat film drums or cases. When such a film is to be projected the usual procedure is to unwind the film from the spool and wind it upon the projection reel. The outer end of the film must also be attached to the core or hub of the projection winding up reel.

This procedure takes time and the frequent handling of the film may damage it. It is also a matter of frequent occurrence that during a lecture or performance the same must be interrupted in order to wait for the film to be wound and unwound from the projection apparatus. Such waiting or delay is objectionable and very irritating.

The object of this invention is to provide a film reel attachment by means of which a spool of film may be mounted upon a film reel without requiring unwinding and winding of the film.

The invention is embodied in a hollow tube adapted to be placed within a spool of film and provided with a spring whereby when the tube is inserted, the inner coil of the film is gripped between the tube and the spring whereby to secure the end of a film to the tube. Of course the reel must have only one flange or side so that the tube which serves as a hub may be pushed into place longitudinally of the hub or center of the reel. In the accompanying drawing illustrating the invention Fig. 1 is a perspective view showing the attachment about to be inserted in a spool of motion picture film.

Fig. 2 is a sectional view showing the attachment and film mounted upon a film reel.

Fig. 3 is a side view of a modified form of the attachment.

Fig. 4 is a sectional view showing the attachment in Fig. 3 in position upon the film reel.

Referring to the drawing the attachment consists of a tube 1 of sufficient length so as to be seized and inserted in the center of a spool of motion picture film 4. The tube has an inner conical or reduced end as at 3. To the tube there is attached on the side a spring clip 2 and at 6 the tube may be slightly undercut so as to space the spring 2 from the tube sufficient to obtain a spring clip action as will be understood.

The tube is attached to the film, or the film to the tube, by inserting the tube within the hollow center of the spool of film 4 as shown in Figs. 1 and 2 and at the same time cause the inner end or coil 7 of the film to slip in between the tube and the spring and thus be secured. The tube now forms a hollow hub for the film and is thereafter pushed into position upon the film reel 8 by sliding it in upon the center pin or shaft 5 of such reel. The latter has of course only one side wall as indicated at 8 in Figs. 2 and 4.

The outer end of the spool of film 4 is of course similarly secured to another tube 1 to be placed upon the winding up reel of the projection apparatus.

Figs. 3 and 4 illustrate a modification in which the tube portion 9 is shorter than the width of the motion picture film 4 and provided with a circular wall or flange 10. The outer end forms a knurled gripping portion 11. The spring clip 2 is attached as in Fig. 1. In use the tube 9 is first secured to the film as in Fig. 1 and thereafter pushed or placed in position upon the center pin or shaft 12 of the film reel 13 against a shoulder 15 thereof. For the purpose of better attachment the center pins may be split as at 14 to provide better frictional engagement with the hub tubes as is obvious.

One of the features of this invention resides in the use of a spring clip in the form of a thin straight blade the thin point of which easily enters between the innermost winding and the adjacent winding of the coil of film. As the hub is inserted into the coil, the thin flat spring enters the windings and grips the free end of the film without scratching the same. The upper edge of the innermost coil is easily moved inward into the space provided by the tapered end of the hub next to the end of the spring.

The attachment according to this invention is inexpensive to manufacture, easy to use, requires but little change in the construction of the film reels and its use eliminates the objectionable unwinding and winding of the film. It may be used not only in projection apparatus but also for enlargement and copying purposes.

I claim:

1. A hub attachment for a spool of motion picture film consisting of a tubular hub body of a different length than the width of the film and a single spring clip on said body for attaching the end of the film thereto, said spring clip being a thin straight blade adapted to enter between the inner end of the coil of film and the adjacent winding thereof, said tubular body having a tapered end forming a space adjacent the free end of the spring whereby to facilitate the placing of the entering point of the spring between the two innermost windings of the coil and for facilitating insertion of the hub in the coil.

2. A hub attachment according to claim 1 in which said tubular hub body is shorter than the width of the film.

3. An attachment for mounting a spool of coiled motion picture film upon a film reel which consists of a single side wall and a shaft, said attachment comprising a tubular body, a single spring clip on said body, the latter and the clip being adapted to be inserted sideways centrally of the coiled spool of film with the inner coil thereof gripped between the body and the clip, said body having a tapered end forming a space adjacent the free end of the spring to facilitate the entry of the spring between the two innermost windings of the coil and to facilitate insertion of the hub in the coil, said body having a hand grip portion extending to one side of the coiled film, said body being adapted to be mounted upon the shaft of the film reel.

HANS MULCH.